(12) United States Patent
Leebow (10) Patent No.: US 8,436,911 B2
(45) Date of Patent: May 7, 2013

(54) TAGGING CAMERA

(75) Inventor: Eric Leebow, New York, NY (US)

(73) Assignee: Freezecrowd, Inc., New York, NY (US)

( * ) Notice: Subject to any disclaimer, the term of this patent is extended or adjusted under 35 U.S.C. 154(b) by 471 days.

(21) Appl. No.: 12/604,107

(22) Filed: Oct. 22, 2009

(65) Prior Publication Data

US 2010/0103277 A1    Apr. 29, 2010

Related U.S. Application Data (63) Continuation-in-part of application No. 12/480,813, filed on Jun. 9, 2009, which is a continuation-in-part of application No. 11/531,964, filed on Sep. 14, 2006, now abandoned.

(60) Provisional application No. 61/107,436, filed on Oct. 22, 2008.

(51) Int. Cl.
*H04N 5/228* (2006.01)
(52) U.S. Cl.
USPC ...................................................... 348/222.1
(58) Field of Classification Search .................. None
See application file for complete search history.

(56) References Cited

U.S. PATENT DOCUMENTS

| | | | |
|---|---|---|---|
| 5,544,305 A | 8/1996 | Ohmaye et al. | |
| 5,859,623 A | 1/1999 | Meyn et al. | |
| 6,035,074 A | 3/2000 | Fujimoto et al. | |
| 6,421,070 B1 | 7/2002 | Ramos et al. | |
| 6,608,563 B2* | 8/2003 | Weston et al. | 340/573.1 |
| 6,629,100 B2 | 9/2003 | Morris et al. | |
| 6,629,104 B1 | 9/2003 | Parulski et al. | |
| 6,724,919 B1 | 4/2004 | Akiyama et al. | |
| 6,847,379 B2 | 1/2005 | Grosvenor et al. | |
| 6,961,446 B2 | 11/2005 | Imagawa et al. | |
| 7,010,751 B2 | 3/2006 | Shneiderman | |
| 7,274,822 B2* | 9/2007 | Zhang et al. | 382/224 |
| 7,403,642 B2 | 7/2008 | Zhang et al. | |
| 8,144,939 B2* | 3/2012 | Thorn | 382/115 |

(Continued)

OTHER PUBLICATIONS

U.S. Office Action dated Jan. 9, 2009; Cited in priority case—U.S. Appl. No. 11/531,964, filed Sep. 14, 2006.

(Continued)

*Primary Examiner* — Luong T Nguyen
(74) *Attorney, Agent, or Firm* — Thompson Hine LLP (57) ABSTRACT

A tagging camera device may include an image capturing logic configured to receive an image signal containing data representing at least one of a photographic image and a digital video. The tagging camera device may further include database communication logic configured to receive from at least one database data representing information from an online social network. The tagging camera device may further include identification logic configured to receive an identifying signal containing data identifying one or more objects appearing in the at least one of the photographic image and the digital video. The tagging camera device may further include tagging logic configured to tag a portion of the at least one of the photographic image and the digital video by associating the portion of the at least one of the photographic image and the digital video with the data representing information from the online social network based on the data identifying the one or more objects appearing in the at least one of the photographic image and the digital video, where the tagging logic is configured to automatically tag the portion of the at least one of the photographic image and the digital video.

28 Claims, 5 Drawing Sheets

U.S. PATENT DOCUMENTS

| | | | |
|---|---|---|---|
| 2002/0048397 A1 | 4/2002 | Lloyd-Jones | |
| 2002/0111939 A1 | 8/2002 | Kondo et al. | |
| 2004/0264780 A1 | 12/2004 | Zhang et al. | |
| 2005/0027705 A1 | 2/2005 | Sadri et al. | |
| 2005/0097080 A1 | 5/2005 | KethiRedy et al. | |
| 2005/0197922 A1 | 9/2005 | Pezaris et al. | |
| 2005/0283497 A1 | 12/2005 | Nurminen et al. | |
| 2006/0033754 A1 | 2/2006 | Evans | |
| 2006/0050993 A1 | 3/2006 | Stentiford | |
| 2006/0098105 A1 | 5/2006 | Okisu et al. | |
| 2006/0184578 A1 | 8/2006 | La Rotonda et al. | |
| 2006/0251339 A1 | 11/2006 | Gokturk et al. | |
| 2006/0274960 A1 | 12/2006 | Tamaru | |
| 2007/0156910 A1 | 7/2007 | Christie et al. | |
| 2007/0255695 A1 | 11/2007 | Hu et al. | |
| 2007/0266312 A1 | 11/2007 | Ayaki et al. | |
| 2007/0282987 A1 | 12/2007 | Fischer et al. | |
| 2007/0288378 A1 | 12/2007 | Ferrara et al. | |
| 2008/0005125 A1 | 1/2008 | Gaedeke | |
| 2008/0046458 A1 | 2/2008 | Tseng et al. | |
| 2008/0062283 A1 | 3/2008 | Matsushita et al. | |
| 2008/0069480 A1 | 3/2008 | Aarabi et al. | |
| 2008/0077595 A1 | 3/2008 | Leebow | |
| 2008/0086458 A1 | 4/2008 | Robinson et al. | |
| 2008/0091723 A1 | 4/2008 | Zuckerberg et al. | |
| 2008/0109244 A1 | 5/2008 | Gupta | |
| 2008/0162450 A1 | 7/2008 | McIntyre et al. | |
| 2008/0197974 A1* | 8/2008 | Kim | 340/10.1 |
| 2008/0220750 A1 | 9/2008 | Steinberg et al. | |
| 2008/0270425 A1 | 10/2008 | Cotgreave | |
| 2008/0275850 A1 | 11/2008 | Asai | |
| 2008/0288588 A1 | 11/2008 | Andam et al. | |
| 2008/0319943 A1 | 12/2008 | Fischer | |
| 2009/0060289 A1 | 3/2009 | Shah et al. | |
| 2009/0136094 A1* | 5/2009 | Driver et al. | 382/115 |

OTHER PUBLICATIONS

Facebook.com customer service FAQ taken from www.facebook.com/help.php, published Nov. 2005, pp. 1-4 Customer Service. The Most Frequently Asked Questions.

"Face annotation for family photo album management", by Chen et al., published 2003, International Journal of Image and Graphics, pp. 1-14.

"Facebook: Threats to Privacy", by Jones et al., published Dec. 14, 2005, pp. 1-76.

* cited by examiner

TAGGING CAMERA

CROSS REFERENCE TO RELATED APPLICATIONS

This application is a Continuation-In-Part of U.S. Non-Provisional application Ser. No. 12/480,813, filed on Jun. 9, 2009, which is a Continuation-In-Part of U.S. Non-Provisional application Ser. No. 11/531,964, filed on Sep. 14, 2006. The disclosures of both applications are hereby incorporated by reference.

This application claims the benefit of U.S. Provisional Application No. 61/107,436, filed on Oct. 22, 2008, the disclosure of which is hereby incorporated by reference.

FIELD OF THE INVENTION

The present invention generally relates to a camera device, and in particular a camera device capable of communicating with computer-based systems that facilitate social networking via the Internet and configured to automatically tag images.

BACKGROUND

A category of Internet applications known as online social networks are increasingly popular. These social networking websites help connect friends, business partners, or other individuals together using a variety of tools. The websites may offer an interactive, user-submitted network of profiles, blogs, groups, photos, MP3s, videos, an internal e-mail system, etc.

Once users register as members at a social networking website, they may create their own profile which contains interests and personal details such as marital status and physical appearance. Often images can be uploaded. Some websites provide the option of uploading videos. Users of the social networking site may tag these images and videos with information entered by the users. For example, a user may tag an uploaded image of a friend with the friend's identity or with comments for all viewers to read.

SUMMARY OF THE INVENTION

A tagging camera device may include an image capturing logic configured to receive an image signal containing data representing at least one of a photographic image and a digital video. The tagging camera device may further include database communication logic configured to receive from at least one database data representing information from an online social network. The tagging camera device may further include identification logic configured to receive an identifying signal containing data identifying one or more objects appearing in the at least one of the photographic image and the digital video. The tagging camera device may further include tagging logic configured to tag a portion of the at least one of the photographic image and the digital video by associating the portion of the at least one of the photographic image and the digital video with the data representing information from the online social network based on the data identifying the one or more objects appearing in the at least one of the photographic image and the digital video, where the tagging logic is configured to automatically tag the portion of the at least one of the photographic image and the digital video.

BRIEF DESCRIPTION OF THE DRAWINGS

In the accompanying drawings, structures are illustrated that, together with the detailed description provided below, describe exemplary embodiments of the claimed invention.

In the drawings and description that follow like elements are identified with the same reference numerals. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Communication," as used herein, refers to a communication between two or more devices (e.g., computer, personal digital assistant, cellular telephone) and can be, for example, a network transfer, a file transfer, an applet transfer, an email, a hypertext transfer protocol (HTTP) transfer, and so on. A communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium," as used herein, refers to a medium that participates in directly or indirectly providing signals, instructions or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, and other media from which a computer, a processor or other electronic device can read.

"Logic," as used herein, includes but is not limited to hardware, firmware, software or combinations of each to perform functions or actions, or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Query," as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores or information sources.

"Signal," as used herein, includes but is not limited to one or more electrical or optical signals, analog or digital signals, data, one or more computer or processor instructions, messages, a bit or bit stream, or other means that can be received, transmitted or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Thus, in one example, the computer-readable medium has software or firmware as it is maintained in a web server for distribution as an application for installation in a device. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

It will be apparent to those skilled in the art, that is, to those who have knowledge or experience in this area of technology, that many uses and design variations are possible for the tagging camera device disclosed herein. The following detailed discussion of various embodiments will illustrate the general principles of the invention. Other embodiments suitable for other applications will be apparent to those skilled in the art given the benefit of this disclosure.

In the interest of clarity, not all of the routine features of the embodiments described herein are shown and described. It will of course, be appreciated that in the development of any such implementation, numerous specific decisions must be made in order to achieve the developer's specific goals, such as compliance with application or business related constraints, and that these specific goals will vary from one implementation to another and from one developer to another. Additionally, it will be appreciated that such development might be complex and time-consuming, but would nevertheless be a routine undertaking of engineering for those of ordinary skill in the art having the benefit of this disclosure.

Figure 1:
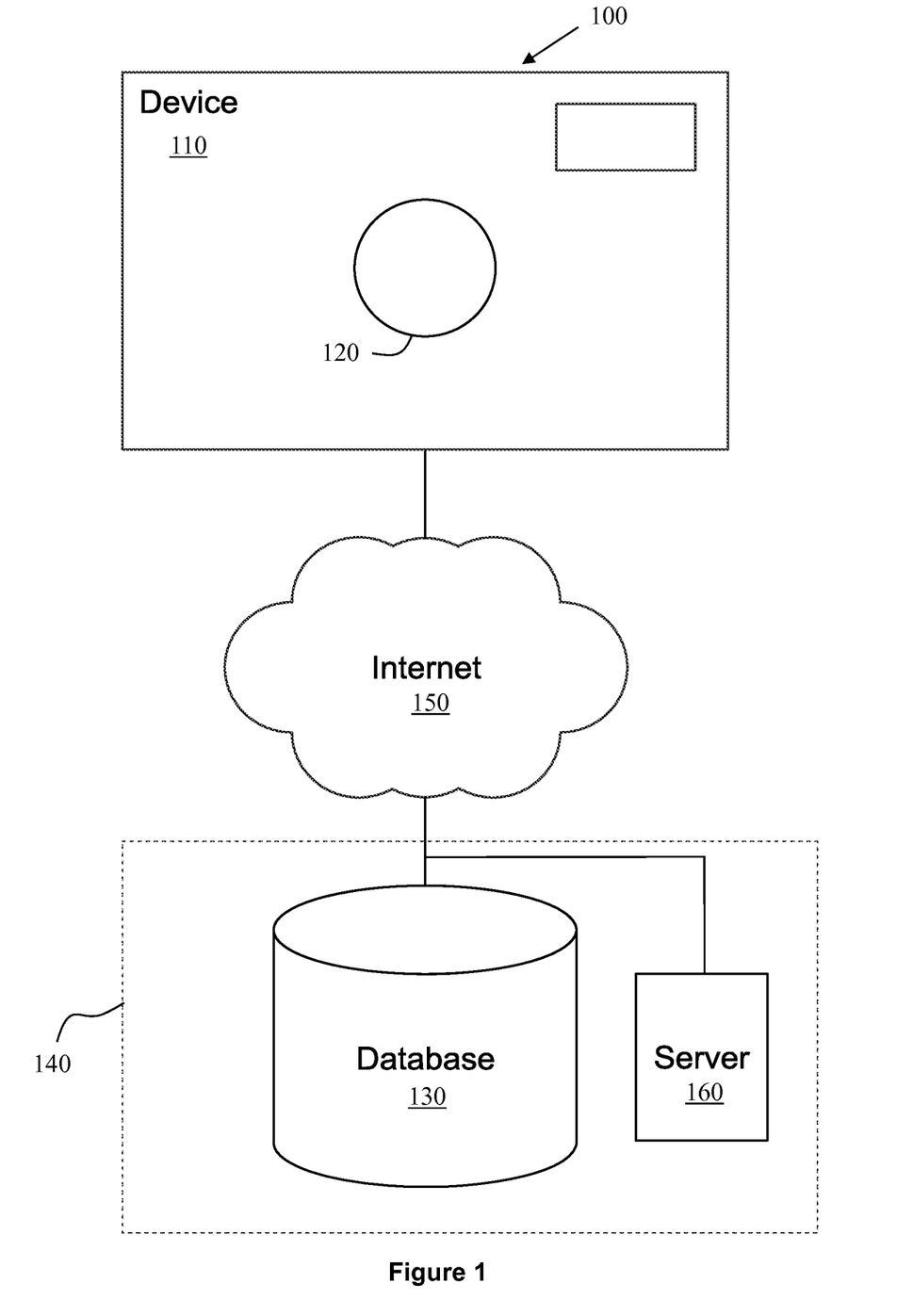
FIG. 1 illustrates one embodiment of a system incorporating a tagging camera device.

FIG. 1 illustrates one embodiment of a system 100 incorporating a tagging camera device 110. In the illustrated embodiment, device 110 may include a lens 120. Device 110 may further include an image capturing logic configured to capture photographic images or digital videos of objects in front device 110 from light transmitted through lens 120. While the device 110 is depicted in FIG. 1 as a traditional camera, it should be understood that the device 110 may be a video camera, a mobile telephone, a personal digital assistant (PDA), a laptop computer, a personal computer (PC), or any other device having image capturing logic.

Device 110 may further include a database communication logic configured to receive from database 130 data representing member information associated with members of an online social network 140 via the internet 150. While FIG. 1 depicts the device 110 being directly connected to the internet 150, it should be understood that the device may be connected to the internet 150 through an intermediate device, such as a PC, a laptop computer, a network terminal, a mobile phone, a PDA, or other networked device.

As used herein, the term the "internet" generally refers to the so called world wide network that connects networks to each other using the Internet Protocol (IP) and other similar protocols. While the illustrated embodiment utilizes the public network, the invention applies equally well to other public and private networks, including systems having architectures dissimilar to that illustrated in system 100. For example, but not limited thereto, the system 100 can find application in a closed university system or a private network of a company.

Database 130 may be implemented, for example, as a database management system (DBMS), an object-oriented database management system (ODBMS), a relational database management system (e.g. DB@, ACCESS, and so on), a file system, or any other conventional database package. Database 130 may be accessed via a structured query language (SQL) or other tools known to one of ordinary skill in the art.

Online social network 140 may include image server 160. Image server 160 manages images such as digital photographs and digital video. Examples of image formats that can be managed by image server 160 include, but are not limited to, Graphical Interchange Format (GIF), Joint Photographics Experts Group (JPEG or JPG), Portable Network Graphics (PNG), Tagged Image File Format (TIFF or TIF), Moving Pictures Expert Group (MPEG or MPG), Audio Video Interleave (AVI), Windows Media Video (WMV), QuickTime (MOV), Real Video (RAM), Flash Video (SWF) and so on.

Device 110 may further include an identification logic configured to receive from an identifying device an identifying signal containing data identifying one or more objects appearing in an image and or video captured by device 110. The identified objects may be people, commercial products, and so on.

Figure 2:
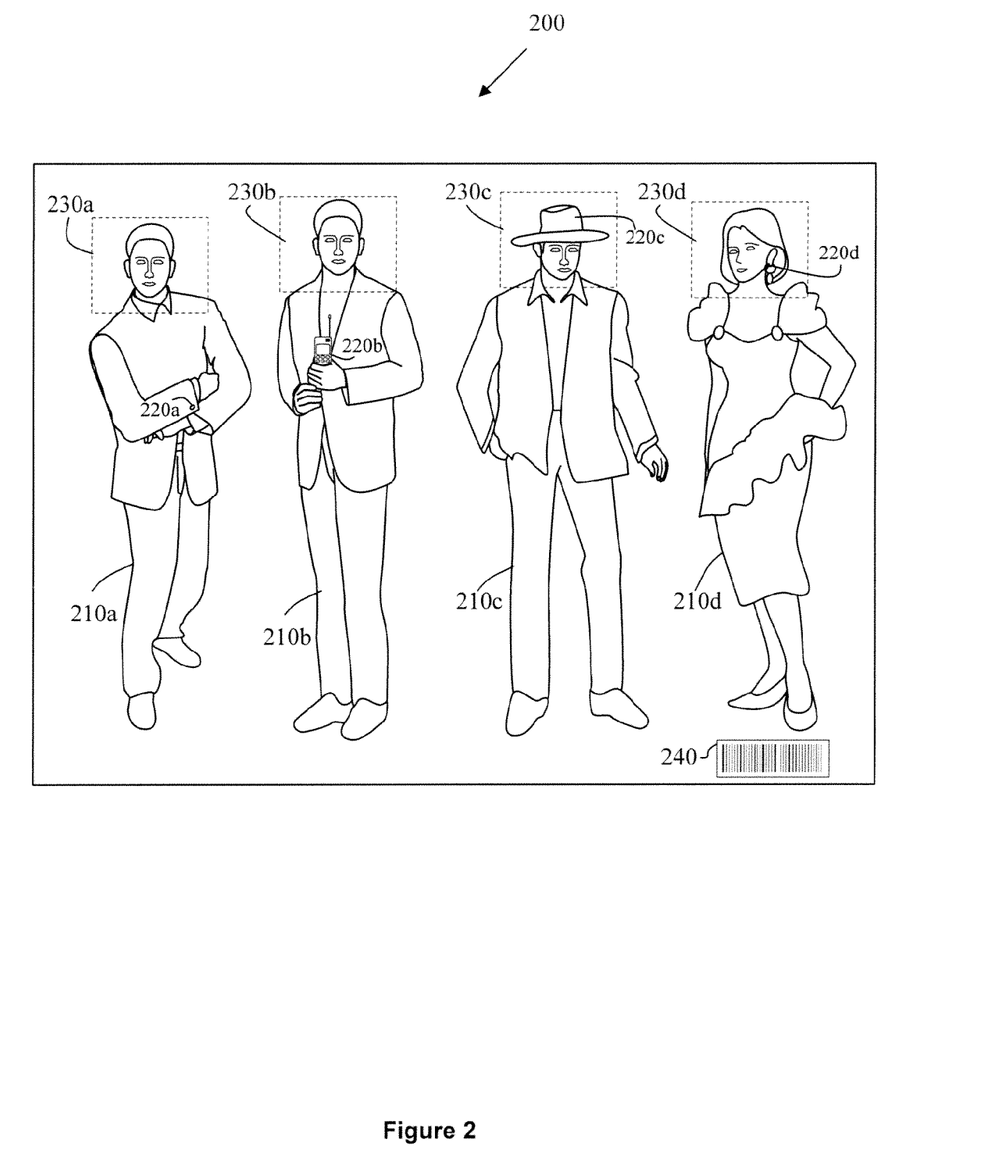
FIG. 2 illustrates an example image captured by a tagging camera device.

FIG. 2 illustrates an example image 200 captured by device 110. In example image 200, objects appearing in the image include persons 210*a-d*. In example image 200, the identifying devices are Radio Frequency Identification (RFID) tag 220*a* on first person 210*a*, wireless telephone 220*b* held by second person 210*b*, hat 220*c* worn by third person 210*c*, and earring 220*d* worn by fourth person 210*d*. In other embodiments, other devices may be used as identifying devices including PDAs, smart phones, cameras, rings, implants, and so on.

In the illustrated embodiment, the signals received from identifying devices 220*a-d* contain data indicating that the person carrying, holding, wearing, etcetera the particular identifying device is a particular member of the online social network 140 shown in FIG. 1.

Device 110 may further include a tagging logic configured to tag a portion of the photographic image or the digital video by associating the portion of the photographic image or the digital video with the data received from database 130 representing information from the online social network. The tagging logic tags the portion of the photographic image or the digital video based on the data received from the identifying devices.

With further reference to FIG. 2, the tagging logic of device 110 may tag portions of image 200. For example, the tagging logic may tag four portions 230*a-d* of image 200. Portions 230*a-d* may include portions of image 200 where features of persons 210*a-d* appear. In the illustrated example, the tagged portions 230*a-d* include the portions of image 200 where the faces of persons 210*a-d* appear.

In one embodiment, device 110 includes a marking logic configured to automatically and electronically mark image 200 to uniquely identify image 200 independently of a file name of image 200. The marking logic may mark image 200 with a bar code 240. In alternative embodiments, the marking logic may mark image 200 by other methods including metadata in the image file.

Figure 3:
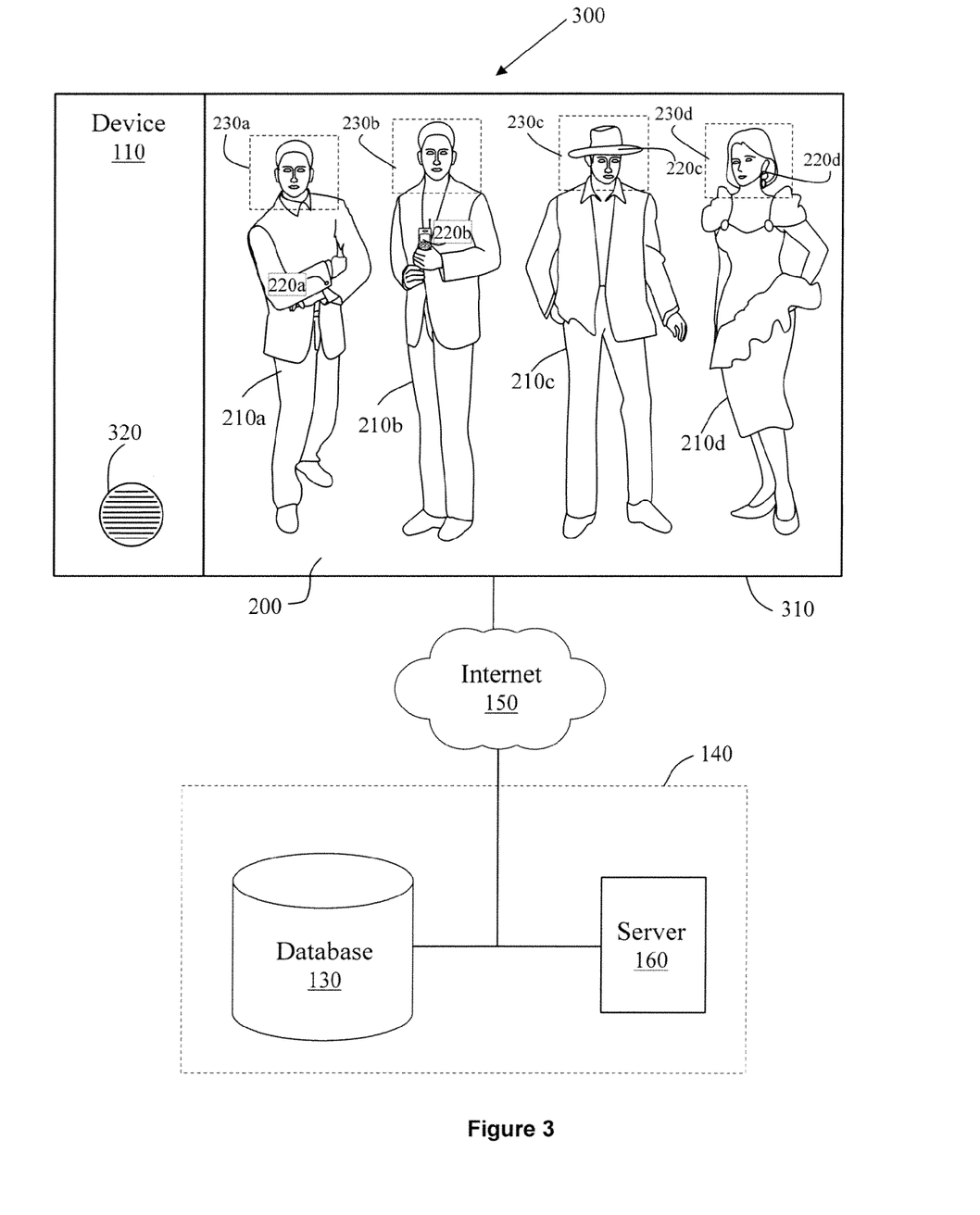
FIG. 3 illustrates a system incorporating a tagging camera device including an image frame viewer.

FIG. 3 illustrates a system 300 incorporating a tagging camera device 110 including an image frame viewer 310. Image frame viewer 310 may include a graphical user interface (GUI). Image frame viewer 310 may display images including photographic images and digital video. In the illustrated embodiment, picture frame viewer 310 displays image 200.

In one embodiment, the tagging camera device 110 may be implemented in a device or combination of devices capable of executing the operations of the various described logics. Devices or combination of devices capable of executing the operations of the various described logics may include cellular phones, smart phones, PDA, notebook computer, and so on.

For example, the various described logics may be implemented in a cellular phone as part of a user or factory installed software application. The cellular phone may include digital photograph or digital video capabilities, and an image frame viewer. The cellular phone may also be capable of communication with online social network 140 via the internet or other networks. The cellular phone may also include a processor, memory, and so on, such that the disclosed logics may be implemented from processor executable instructions or operations provided on a computer-readable medium. Thus, in an example, a computer-readable medium may store software comprising the various disclosed logics.

Upon the image capturing logic capturing image 200, the identification logic of device 110 may receive identifying signals from identifying devices 220*a-d* identifying objects appearing in image 200 as persons 210*a-d* who are particular members of online social network 140. The database communication logic of device 110 may then, via the internet 150, request from database 130 data representing member information regarding the particular members of the online social network 140, persons 210*a-d*. Finally, the tagging logic may automatically tag portions 230*a-d* of image 200 by associating the portions 230*a-d* with the member information corresponding to each of persons 210*a-d*, respectively.

In another embodiment, device 110 may include recognition logic configured to recognize persons appearing in image 200 from the persons' physical features. Once the recognition logic has recognized a person, the recognition logic may transmit a signal identifying the person as a particular member of the online social network 140. The receiving logic may receive the signal from the recognition logic. The database communication logic of device 110 may then via the internet 150 request from database 130 data representing member information regarding the particular members of the online social network 140, persons 210*a-d*. Finally, the tagging logic may automatically tag portions 230*a-d* of image 200 by associating the portions 230*a-d* with the member information corresponding to each of persons 210*a-d*, respectively.

In one embodiment, device 110 includes item associating logic configured to associate an item with the tagged portions 230*a-d*. Items may be one of many known in the art (e.g. a speech bubble, a comment, a video clip, a sound clip, and so on). For example, a user may associate a comment with tagged portion 230*a* corresponding to person 210*a* commenting on person 210*a*.

In another embodiment, device 110 may include a microphone 320 and a sound recording logic. The sound recording logic may record sounds received and transmitted by microphone 320 and associate the sounds with the tagged portions 230*a-d* of image 200. For example, a user may record a comment and associate the comment with tagged portion 230*a* corresponding to person 210*a*.

In one embodiment, device 110 may include touch screen logic. The touch screen logic may cause image frame viewer 310 to display member information associated with particular members of the online social network appearing in image 200 upon a user touching the related portion of image 200 on image frame viewer 310. For example, a user may touch portion 230a of image 200 on image frame viewer 310. Upon detecting the touch on portion 230a, the touch screen logic may cause image frame viewer 310 to display member information associated with person 210a.

Member information that may be displayed includes a member profile, a telephone number, an email address, an identifier within the online social network, and contextual information such as Favorite Music, Favorite Movies, Favorite Books, Favorite Television Shows, Favorite Places, Interests, and others.

In another embodiment, images may be tagged with geophysical information so that member information will include location information. This may be accomplished by a Global Positioning System ("GPS") tracking logic where device 110 includes GPS capabilities and as image capturing logic captures the image, GPS tracking logic associates location information with the image.

In another embodiment, the touch screen logic may cause device 110 to initiate communication with a particular member of the online social network 140 upon a user touching the portion of image 200 associated the particular member on image frame viewer 310. For example, a user may touch portion 230a of image 200 on image frame viewer 310. Upon detecting the touch on portion 230a, the touch screen logic may cause device 110 to initiate communication with person 210a. Communication methods for device 110 to initiate communication with person 210a may include a telephone call, a text message, an email, and contacting the particular member via an identifier within the online social network 140.

Telephone communication may be implemented, among other methods, via wireless phone capabilities of device 110. Email communication may be implemented via an mail server (not shown) in connection with image server 150, database 130, and device 110. Text messaging may be implemented via a short message service (SMS) or video message service (VMS) server (not shown) in connection with image server 150, database 130, and device 110.

In one embodiment, a registered user of online social network 140 may invite a friend who is not a member of online social network 140 to join the online social network 140 by taking a picture such as image 200. Since the friend appearing in the picture is not yet a member of online social network 140, identification logic fails to identify the friend. The user may tag the picture by identifying the friend by first and last name and e-mail address. The user may also indicate a portion of the picture to tag. Once the information is entered, an e-mail invitation is automatically sent to the friend. The friend receives an email invite which enables them to sign up for the online social network 140. Any person in a group picture who is not already a registered member of online social network 140 can be invited through picture invitation. This process can also be used in connection with digital video.

A similar process can be used for self registration by tagging people in image 200 by identifying persons in the image by first and last name and e-mail address. All tagged persons may complete the registration when they receive a link sent to them through e-mail. This process can also be used in connection with video.

Figure 4:
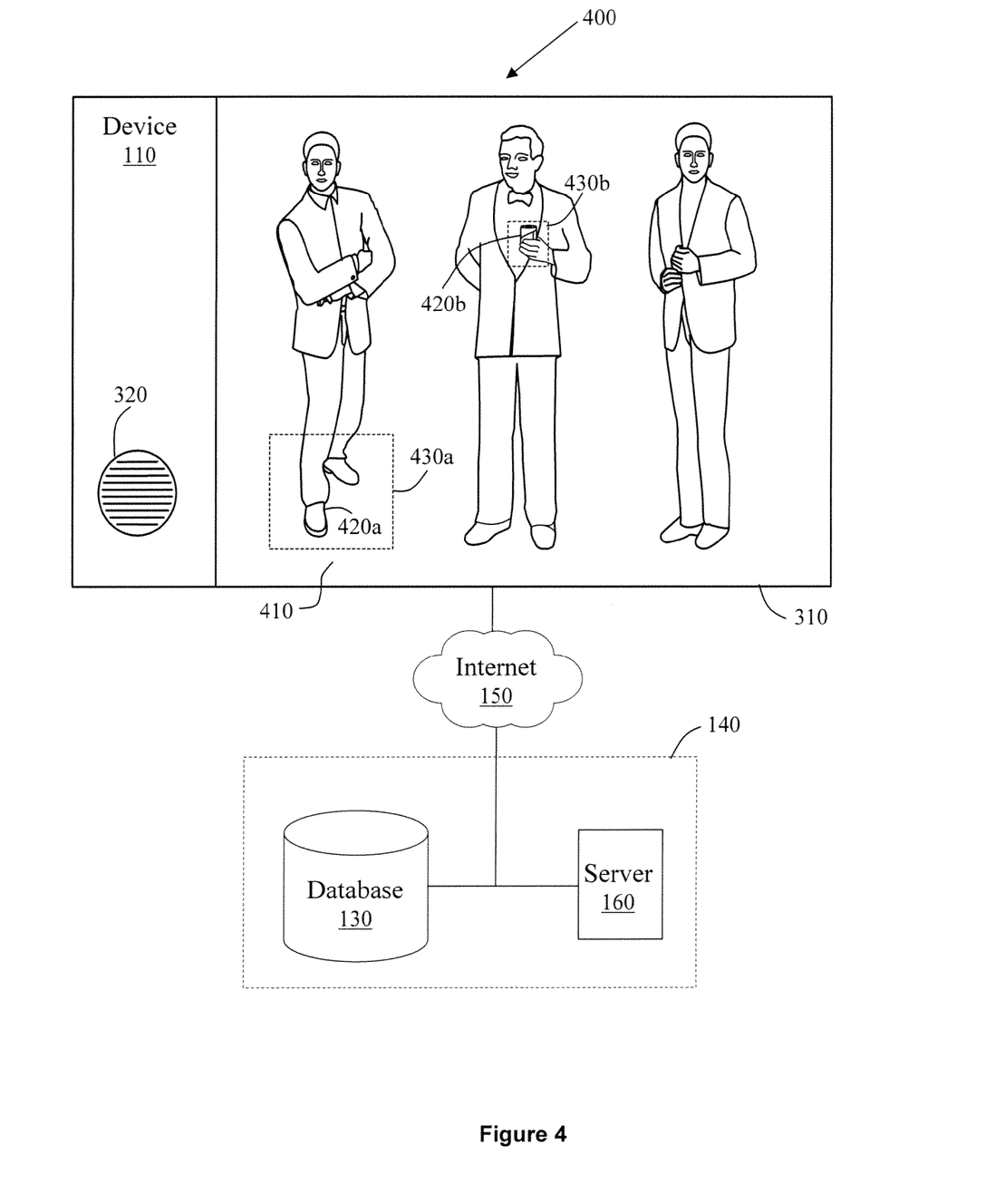
FIG. 4 illustrates a system incorporating a tagging camera device including an image frame viewer.

FIG. 4 illustrates a system 400 incorporating a device 110 including an image frame viewer 310. As stated above, image frame viewer 310 may display images including photographic images and digital video. In the illustrated embodiment, picture frame viewer 310 displays image 410.

In one embodiment, upon a user taking image 410 using the image capturing logic of device 110, the identification logic of device 110 may receive identifying signals identifying objects appearing in image 200 as commercial products. The database communication logic of device 110 may then, via the interne 150, request from database 130 data representing product information regarding some of the products appearing in image 410. Finally, the tagging logic may tag portions of image 410 by associating the portions with the product information corresponding to each product.

In one embodiment, the portions tagged are the product portions or the portions of image 410 where the products appear in image 410. Product information associated with the product portions tagged may include product specifications, product advertisement, product offers, product coupons, product purchasing information, product ordering information, and so on.

In the illustrated embodiment, upon a user taking image 200 using device 110, the identification logic of device 110 receives identifying signals including data identifying objects 420a-b appearing in image 410 as commercial products. The data may identify shoe 420a as a particular brand and style of shoe and beverage 420b as a particular brand of beverage. The database communication logic of device 110 may then request from database 130 data representing product information regarding shoe 420a and beverage 420b. Finally, the tagging logic automatically tags portion 430a of image 410 by associating portion 430a with the product information corresponding to the particular brand and style of shoe 420a. Similarly, the tagging logic automatically tags portion 430b of image 410 by associating portion 430b with the product information corresponding to the particular brand of beverage 420b.

In another embodiment, device 110 may include recognition logic configured to recognize products appearing in image 410 from the products' packaging or physical features. Once the recognition logic has recognized a product, the recognition logic may transmit a signal identifying the product as a particular brand or type of product. The receiving logic may receive the signal from the recognition logic. The database communication logic of device 110 may then request from database 130 data representing product information regarding the particular products identified. Finally, the tagging logic may automatically tag portions 430a-b of image 410 by associating the portions 430a-b with the respective product information.

In one embodiment, device 110 includes item associating logic configured to associate an item with the tagged portions 430a-b of image 410. As discussed above, items may be one of many known in the art (e.g. a speech bubble, a comment, a video clip, a sound clip, and so on). For example, a user may associate a comment with tagged portion 430a corresponding to product 420a commenting on product 420a.

In an embodiment where device 110 includes microphone 320 and sound recording logic, the sound recording logic may record sounds received and transmitted by microphone 320 and associate the sounds with the tagged portions 430a-b of image 410. For example, a user may record a comment and associate the comment with tagged portion 430a corresponding to product 420a.

In an embodiment where device 110 includes touch screen logic, the touch screen logic may cause image frame viewer 310 to display product information associated with particular products appearing in image 410. For example, upon a user touching portion 430a of image 410 on image frame viewer 310, the touch screen logic may cause image frame viewer 310 to display product information associated with shoe 420a such as product specifications, product advertisement, product offers, product coupons, product purchasing information, product ordering information, links to sites where the product may be purchased, and so on.

Figure 5:
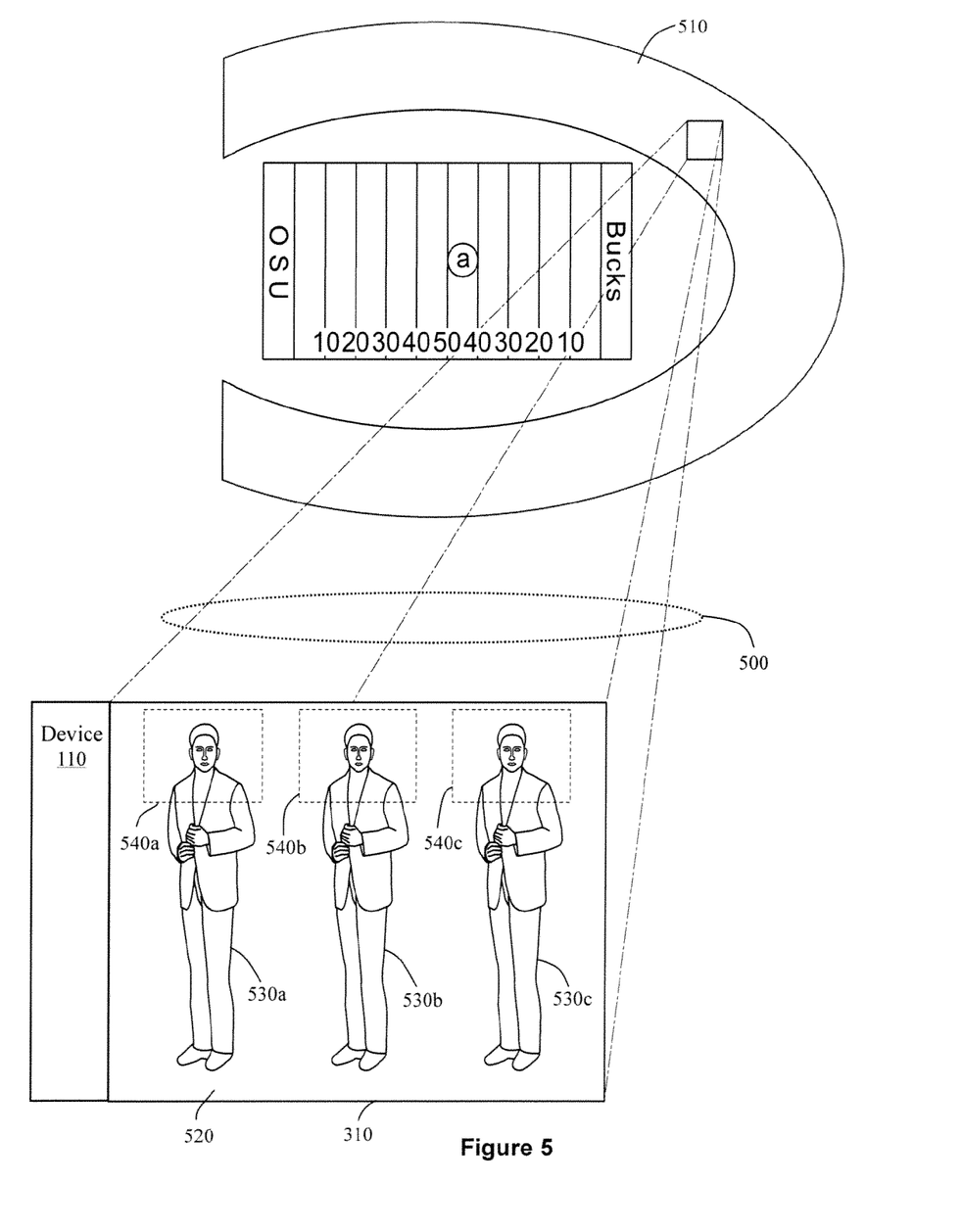
FIG. 5 illustrates a tagging camera device including an image frame viewer capable of receiving a live event broadcast signal.

FIG. 5 illustrates a device 110 including an image frame viewer 310 receiving a live event broadcast signal 500. In one embodiment, device 110 may include a live event broadcast signal receiving logic configured to receive live event broadcast signal 500. A live event may be a sporting event, concert and so on, which may take place at, for example, stadium 510. In stadium 510 may be persons that are members of the online social network 140. The live event broadcast signal receiving logic may receive live event broadcast signal 500 from TV networks, cable signal, and so on. In the embodiment, live event broadcast signal receiving logic transmits the live event broadcast to the image capturing logic of device 110. The image capturing logic may then capture image 520 such as a digital picture or video from live event broadcast signal 500. Upon the image capturing logic capturing image 520, the identification logic of device 110 may receive identifying signals identifying objects appearing in image 520 as persons 530a-c who are particular members of online social network 140. The database communication logic of device 110 may then request data representing member information regarding the particular members of the online social network 140, persons 530a-c. Finally, the tagging logic may automatically tag portions 540a-c of image 510 by associating the portions 540a-c with the member information corresponding to each of persons 530a-c, respectively.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, one of the above described embodiments may further employ telescoping arms. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A device comprising:
   at least one lens;
   image capturing logic configured to capture at least one of a photographic image and a digital video of at least one person from light transmitted through the at least one lens;
   database communication logic configured to receive from at least one database data representing member information associated with members of an online social network;
   identification logic configured to receive a signal from an identifying device on the at least one person, where the signal contains data indicating that the at least one person is a particular member of the online social network;
   tagging logic configured to automatically tag a portion of the at least one of the photographic image and the digital video by associating the portion of the at least one of the photographic image and the digital video with the particular member of the online social network; and
   an image frame viewer configured to display the at least one of the photographic image and the digital video.

2. The device of claim 1, where the identifying device is selected from the group consisting of an Radio Frequency Identification (RFID) tag, a ring, an earring, a hat, a wireless telephone, a personal digital assistant (PDA), a smart phone, and an implant.

3. The device of claim 1, further comprising recognition logic configured to recognize the at least one person from physical features of the at least one person appearing in the at least one of the photographic image and the digital video, where a receiving logic receives the signal from the recognition logic.

4. The device of claim 1, where the portion of the at least one of the photographic image and the digital video includes at least a portion of the at least one of the photographic image and the digital video where the at least one person appears.

5. The device of claim 1, further comprising item associating logic configured to associate an item with the portion of the at least one of the photographic image and the digital video, where the item is selected from the group consisting of a speech bubble, a comment, a video clip, and a sound clip.

6. The device of claim 1, further comprising a sound recording logic configured to record sounds and associate the sounds with the portion of the at least one of the photographic image and the digital video.

7. The device of claim 1, further comprising marking logic configured to automatically electronically mark the at least one of the photographic image and the digital video to uniquely identify the at least one of the photographic image and the digital video independently of a file name of the at least one of the photographic image and the digital video, where the marking logic is configured to automatically electronically mark the at least one of the photographic image and the digital video with a mark selected from the group consisting of a bar code and metadata.

8. The device of claim 1, further comprising touch screen logic configured to cause the image frame viewer to display the member information associated with the particular member of the online social network upon a user touching the portion of the at least one of the photographic image and the digital video on the image frame viewer.

9. The device of claim 8, where the member information associated with the particular member of the online social network includes the member information selected from the group consisting of a member profile, a telephone number, an email address, and an identifier within the online social network.

10. The device of claim 1, further comprising touch screen logic configured to cause the device to initiate communication with the particular member of the online social network upon a user touching the portion of the at least one of the photographic image and the digital video on the image frame viewer.

11. The device of claim 10, where the device initiates communication with the particular member of the online social network via a communications method selected from the group consisting of a telephone call, a text message, an email, and contacting the particular member via an identifier within the online social network.

12. The device of claim 1, further comprising product tagging logic configured to tag at least one product appearing in the at least one of the photographic image and the digital video by associating a product portion of the at least one of the photographic image and the digital video with product information, where the at least one product appears in the product portion of the at least one of the photographic image and the digital video.

13. The device of claim 12, where the product information includes at least one of product advertisement, product offers, product coupons, product purchasing information, and product ordering information.

14. The device of claim 12, further comprising touch screen logic configured to cause the image frame viewer to display the product information associated with the product portion upon a user touching the product portion on the at least one of the photographic image and the digital video on the image frame viewer.

15. A non-transitory computer readable medium having stored thereon computer executable instructions comprising:
   image capturing logic configured to receive an image signal containing data representing at least one of a photographic image and a digital video;
   database communication logic configured to receive from at least one database data representing information from an online social network;
   identification logic configured to receive an identifying signal containing data identifying one or more objects appearing in the at least one of the photographic image and the digital video; and
   tagging logic configured to tag a portion of the at least one of the photographic image and the digital video by associating the portion of the at least one of the photographic image and the digital video with the data representing information from the online social network based on the data identifying the one or more objects appearing in the at least one of the photographic image and the digital video, where the tagging logic is configured to automatically tag the portion of the at least one of the photographic image and the digital video.

16. The non-transitory computer readable medium of claim 15, further comprising a sound recording logic configured to record sounds and associate the sounds with the portion of the at least one of the photographic image and the digital video.

17. The non-transitory computer readable medium of claim 15, further comprising marking logic configured to automatically electronically mark the at least one of the photographic image and the digital video to uniquely identify the at least one of the photographic image and the digital video independently of a file name of the at least one of the photographic image and the digital video.

18. The non-transitory computer readable medium of claim 17, where the marking logic is configured to automatically electronically mark the at least one of the photographic image and the digital video with a mark, where the mark is selected from the group consisting of a bar code and metadata.

19. The non-transitory computer readable medium of claim 15,
   where the data representing information from the online social network includes data representing member information associated with members of the online social network,
   where the identification logic is configured to receive the identifying signal from a signaling device on a at least one person appearing in the at least one of the photographic image and the digital video,
   where the identifying signal indicates that the at least one person is a particular member of the online social network, and
   where the tagging logic is configured to automatically tag the portion of the at least one of the photographic image and the digital video by associating the portion of the at least one of the photographic image and the digital video with the particular member of the online social network.

20. The non-transitory computer readable medium of claim 19, where the identifying signal is received from a device selected from the group consisting of an Radio Frequency Identification (RFID) tag, a ring, an earring, a hat, a wireless telephone, a personal digital assistant (PDA), a smart phone, and an implant.

21. The non-transitory computer readable medium of claim 19, further comprising recognition logic configured to recognize the at least one person appearing in the at least one of the photographic image and the digital video from physical features of the at least one person appearing in the at least one of the photographic image and the digital video, where the identification logic receives the signal from the recognition logic.

22. The non-transitory computer readable medium of claim 19, where the portion of the at least one of the photographic image and the digital video includes at least a portion of the particular member of the online social network as the particular member of the online social network appears on the at least one of the photographic image and the digital video.

23. The non-transitory computer readable medium of claim 19, further comprising touch screen logic configured to cause an image frame viewer to display the member information associated with the particular member of the online social network upon a user touching the portion of the at least one of the photographic image and the digital video on the image frame viewer.

24. The non-transitory computer readable medium of claim 23, where the member information associated with the particular member of the online social network includes the member information selected from the group consisting of a member profile, a telephone number, an email address, and an identifier within the online social network.

25. The non-transitory computer readable medium of claim 19, further comprising touch screen logic configured to initiate communication with the particular member of the online social network upon a user touching the portion of the at least one of the photographic image and the digital video on an image frame viewer.

26. The non-transitory computer readable medium of claim 25, where communication with the particular member of the online social network is initiated via a communications method selected from the group consisting of a telephone call, a text message, an email, and contacting the particular member via an identifier within the online social network.

27. The non-transitory computer readable medium of claim 15,
   where the data representing information from the online social network includes data representing product information regarding at least one product appearing in the at least one of the photographic image and the digital video, where the identifying signal identifies the at least one product appearing in the at least one of the photographic image and the digital video, and where the tagging logic is configured to tag the at least one product by associating a product portion of the at least one of the photographic image and the digital video with the data representing product information regarding the at least one product.

28. The non-transitory computer readable medium of claim 27, further comprising touch screen logic configured to cause an image frame viewer to display the product information associated with the product portion upon a user touching the product portion on the at least one of the photographic image and the digital video on the image frame viewer.

* * * * *